Patented Dec. 27, 1949

2,492,663

UNITED STATES PATENT OFFICE 2,492,663

HALOTHIENYLETHANOLS

John W. Schick, Camden, N. J., assignor to Socony-Vacuum Oil Company, Incorporated, a corporation of New York No Drawing. Application February 12, 1947, Serial No. 728,197

10 Claims. (Cl. 260—329)

This invention relates to the synthesis of thienylethanols and, more particularly, is directed to new and useful substituted thienylethanols and to the preparation thereof.

The process of this invention, broadly stated, comprises the condensation of thienylsodium or a substituted thienylsodium compound with ethylene oxide in the presence of an inert organic solvent to give a sodium thienyl ethylate which, upon subsequent hydrolysis, yields the corresponding thienylethanol.

The above process affords a method for synthesizing thienylethanols in a more convenient and comparatively more rapid manner than the method heretofore employed, namely, the conventional Grignard reaction between a thienyl magnesium bromide or iodide and ethylene oxide. The process of this invention, moreover, provides a method for preparing substituted thienylethanols which have not heretofore been synthesized due to the difficulty or, in some instances, the impossibility of preparing suitable Grignard reagents. Thus, substituted chlorothienylethanols, which heretofore have not been made due to the inability of dichlorothiophenes to form Grignard reagents, may now be synthesized in accordance with the process of the present invention. Likewise, substituted alkylthienylethanols may be prepared in accordance with the process described herein. Thus, the present invention contemplates a method for preparing a thienylethanol having the general formula:

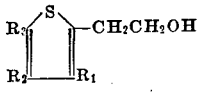

where $R_1$, $R_2$, and $R_3$ represent hydrogen, halogen or alkyl substituents on the thiophene ring.

In carrying out the process of this invention, a prepared and isolated thienylsodium compound may be condensed with ethylene oxide in the presence of an inert organic solvent or, as will generally be more convenient to afford a one-step reaction. the thienylsodium compound may be prepared in situ by reacting the desired substituted thiophene with sodium in the presence of an appropriate solvent, and thereafter adding ethylene oxide to the reaction product mixture so obtained under conditions effecting condensation between the ethylene oxide and the thienylsodium compound present in the reaction product mixture to give the corresponding sodium thienyl ethylate which, upon hydrolysis, yields the desired thienylethanol.

The nature of the thienylsodium compound, and consequently the nature of the thienylethanol obtained, will, in those instances in which a halogenated thiophene is employed as one of the initial reactants, depend in part on the organic solvent used. Thus, it has been established that when a halogenated thiophene having an available alpha hydrogen atom is reacted with sodium in the presence of an ethereal solvent having not more than four carbon atoms per atom of oxygen, the sodium, instead of replacing a halogen atom on the thiophene ring, as ordinarily would be expected, undergoes an unusual substitution reaction with replacement of the hydrogen atom to yield a halogenated thienylsodium. On the other hand, when a hydrocarbon solvent is used, in the reaction of a similar halogenated thiophene with sodium, the sodium replaces a halogen atom to yield a thienylsodium compound. Thus, for example, when reacting monochlorothiophene with sodium in the presence of diethyl ether, the resulting compound is chlorothienylsodium, but when the reaction is carried out in the presence of benzene as the solvent, the resulting compound is thienylsodium. In place of diethyl ether used in the preparation of halothienylsodium compounds, other suitable ethereal solvents include dimethyl ether, methyl ethyl ether, dimethyl ether of ethylene glycol and the dimethyl ethers of polyethylene glycols. In preparing thienylsodium compounds from a halothiophene, suitable solvents include, in addition to benzene, other hydrocarbons such as toluene, hexane, xylene, etc., and ethers in which the ratio of carbon to oxygen atoms is greater than four to one. When thiophene or an alkylthiophene is used as one of the initial reactants, any of the above organic solvents may be used in effecting metalation and subsequent condensation of the metalated thiophene with ethylene oxide. It has been found, however, that in effecting metalation of thiophene or an alkylthiophene, it is essential to carry out the reaction in the presence of an organic halide, such as an alkyl, aryl, or aralkyl halide. The function of the alkyl, aralkyl, or aryl halide in the metalation reaction appears to lie in the intermediate formation of the corresponding alkyl, aralkyl, or arylsodium as a result of the reaction with sodium, said organosodium, in turn, serving as a metalating agent to yield a product of alkylthienylsodium which, in accordance with the process of this invention, undergoes further reaction with ethylene oxide to yield a product which, upon hydrolysis, gives rise to thienylethanol compounds.

Sodium may be introduced into the initial reaction mixture as metallic sodium or in the form of an alloy containing sodium in substantial proportion, preferably as its major constituent. A particularly effective means for introducing sodium into the reaction mixture is from a sodium amalgam. The use of a sodium amalgam has generally been found to give higher yields of the desired metalated thiophene compound than the use of metallic sodium. It appears that the presence of a small amount of mercury in the initial reaction mixture behaves as a catalyst in promoting the metalation of the thiophene compound present. If desired, the reaction may be facilitated by adding a small quantity of mercury to the reaction mixture containing sodium and thiophene reactant. In general, it may be stated that the reaction rate of the metalation reaction, and consequently the yield of desired metalated thiophene compound obtained in a given time, is dependent upon the particle size of the sodium employed. As a rule, the smaller the particle size of sodium used, the faster was the rate of reaction. Accordingly, finely divided sodium in the form of a finely subdivided sodium amalgam, sodium sand or sodium shot is preferred for use in the initial metalation reaction.

Since fusion of the finely divided sodium or sodium amalgam is to be avoided, the temperature of initial reaction will generally be below the melting point of sodium or the particular sodium amalgam employed. Usually the initial metalation will be carried out at reflux temperature of the organic solvent employed, providing said reflux temperature does not exceed the melting point of sodium or the particular alloy thereof which is used.

Due to the high reactivity of sodium and the resultant thienylsodium compound, it is essential to exclude moisture and air from the reaction zone and to carry out the initial metalation reaction in an inert atmosphere, such as nitrogen or other of the inert gases. If the solvent employed is one of low boiling point such as diethyl ether, the vapor of said solvent may provide the inert atmosphere under which the initial metalation reaction takes place.

The reaction mixture of thienylsodium compound obtained in accordance with the above procedures or a mixture of previously prepared and isolated thienylsodium compound dissolved in an inert organic solvent is then, in accordance with the process of this invention, brought into contact with ethylene oxide. This compound, being a gas at ordinary temperature, may be bubbled into the thienylsodium compound solution or, as is preferred, a cold solution of ethylene oxide in an inert organic solvent is slowly added with agitation to the thienylsodium compound solution maintained at a temperature of approximately 0–10° C. by cooling in an ice bath. During the course of addition of the ethylene oxide the temperature of the reaction mixture rises but is generally maintained below the boiling point of the particular solvent used. The temperature of the reaction mixture then slowly begins to drop, so that the use of the ice bath is no longer necessary and when the temperature of the mixture reaches room temperature, it is a general indication that condensation between ethylene oxide and the thienylsodium compound has been completed to give a sodium thienyl ethylate. Hydrolysis of this compound may then be effected in any suitable manner, usually simply by adding an acidic aqueous solution such as an aqueous solution of mineral acid, for example, aqueous hydrochloric acid solution, to the reaction product mixture.

The resulting mixture consisting of an aqueous layer and an organic solvent layer is then separated and the organic layer preferably treated with a suitable drying agent, such as anhydrous sodium sulfate. After removal of the organic solvent from the dried organic layer, the residue is subjected to distillation, preferably under reduced pressure, to yield the desired thienylethanol compound.

The following examples will serve to illustrate the process of this invention without limiting the same:

*Example 1*

2-thienylsodium was prepared by adding a mixture of 118 grams (1 mole) of 2-chlorothiophene in 500 milliliters of benzene to a sodium amalgam sand containing 50 grams (2.17 gram atoms) of sodium and 20 grams (0.10 gram atom) of mercury and refluxing the reaction mixture with agitation in a nitrogen atmosphere for a period of 3 hours. The reaction mixture so obtained was cooled to 10° C. in an ice bath and 44 grams (1 mole) of ethylene oxide in 100 milliliters of benzene were added slowly over a period of 20 minutes. The temperature rose to 73° C. and then slowly dropped. The ice bath was removed and stirring continued until the temperature reached room temperature. A solution containing 125 milliliters of concentrated hydrochloric acid in 325 milliliters of distilled water was cautiously added, with stirring, and the whole solution then filtered. The benzene layer was separated from the reaction mixture, dried over anhydrous sodium sulfate and evaporated on a steam bath to remove the benzene therefrom. The residue was vacuum-distilled to yield 60 grams (47 per cent) of 2-(2-thienyl) ethanol. This compound is a white, oily fluid having the odor of roses, a boiling point of 99–100° C. at a pressure of 7 millimeters of mercury, and a refractive index of 1.5478 at 20° C.

The phenylurethan of this compound was prepared and was found to have a melting point of 52–53° C. Analysis of the phenylurethan showed a sulfur content of 12.95 per cent and a nitrogen content of 5.79 per cent, the calculated sulfur content being 12.96 per cent and the calculated nitrogen content being 5.67 per cent.

*Example 2*

5-chloro-2-thienylsodium was prepared by adding a mixture of 118 grams (1 mole) of 2-chlorothiophene in 700 milliliters of diethyl ether dropwise at reflux temperature in an atmosphere of nitrogen over a period of 2½ hours, with agitation, to a sodium amalgam sand, containing 35 grams (1.56 gram atoms) of sodium and 20 grams (0.10 gram atom) of mercury, and 300 milliliters of diethyl ether. After the addition was completed, the reaction mixture was warmed for an additional 2 hours. It was then cooled in an ice bath and a cold solution of 66 grams (1.5 moles) of ethylene oxide in 200 milliliters of diethyl ether was added, with stirring, over a period of 1 hour. The ice bath was then removed and the solution stirred for an additional 30 minutes, after which it was warmed to reflux for 2 hours. Unreacted sodium was then destroyed with 150 milliliters of ethanol. A solution of 500 milliliters of water and 170 milliliters of concentrated hydrochloric acid was added to the reaction mixture over a period of ½ hour. The ether layer of the mixture so obtained was salted out of solution with sodium chloride, separated and dried over anhydrous sodium sulfate. The ether was removed on a steam bath and distillation of the residue under reduced pressure yielded 35 grams (22 per cent yield) of 2-(5-chloro-2-thienyl) ethanol. This compound had an odor resembling roses and a boiling point of 98.5–100° C. at a pressure of 1–2 millimeters of mercury. The refractive index of the compound was 1.5576 at a temperature of 20° C.

The phenylurethan derivative was prepared and found to have a melting point of 57–58° C. and, upon analysis, showed a sulfur content of 12.14 per cent and a nitrogen content of 4.81 per cent, the calculated sulfur content being 11.37 per cent and the calculated nitrogen content being 4.97 per cent.

*Example 3*

4-methyl-2-thienylsodium was prepared by adding a cold mixture of 64 grams (1.0 mole) of ethyl chloride in 300 milliliters of diethyl ether dropwise over a period of 1 hour in a nitrogen atmosphere to an agitated mixture of sodium amalgam sand, containing 46 grams (2 gram atoms) of sodium and 12 grams (0.06 gram atom) of mercury, and 147 grams (1 mole) of 3-methylthiophene in 200 milliliters of diethyl ether which was cooled to a temperature of 0–5° C. by means of an ice bath. After the addition was completed, the ice bath was removed to permit the temperature to rise. However, the temperature was kept below the reflux temperature of the ether for 1 hour, after which it was warmed to reflux for 15 minutes to insure complete reaction. The reaction was then cooled below 10° C. by means of an ice bath and a cooled solution of 44 grams (1 mole) of ethylene oxide in 100 milliliters of diethyl ether was added, with agitation, over a period of 1 hour. Upon removal of the ice bath, the temperature rose to near the reflux temperature of ether. The reaction mixture was then stirred until it had cooled to room temperature. A solution containing 125 milliliters of concentrated hydrochloric acid in 325 milliliters of water was cautiously added. The ether layer of the mixture so obtained was then separated and dried over an anhydrous sodium sulfate. After removal of the ether on a steam bath, the residue was distilled under reduced pressure to yield 71 grams (50 per cent yield) of 2-(4-methyl-2-thienyl) ethanol having a boiling point of 87–89° C. at a pressure of 2 millimeters of mercury and a refractive index of 1.5397 at 20° C.

The phenylurethan derivative of this compound was prepared and was found to have a melting point of 68–69° C., and, upon analysis, showed a sulfur content of 12.15 per cent and a nitrogen content of 5.43 per cent, the calculated sulfur content being 12.26 per cent and the calculater nitrogen content being 5.35 per cent.

*Example 4*

4-tertiary-butyl-2-thienylsodium was prepared by adding a cold mixture of 32 grams (0.5 mole) of ethyl chloride in 300 milliliters of diethyl ether dropwise over a period of 1 hour in an atmosphere of nitrogen to an agitated mixture of sodium amalgam sand, containing 46 grams (2 gram atoms) of sodium and 12 grams (0.06 gram atom) of mercury, and 70 grams (0.5 mole) of 2-tertiary-butylthiophene in 200 milliliters of diethyl ether which was cooled to a temperature of 0–5° C. by means of an ice bath. After the addition was completed, the reaction mixture was stirred for an additional ½ hour and then the ice bath was removed. After stirring at room temperature for ½ hour, the reaction mixture was warmed to reflux for an additional ½ hour. It was then cooled to below 10° C. by means of an ice bath and 32 grams (0.5 mole) of ethylene oxide in 100 milliliters of diethyl ether were added over a period of 1 hour. The temperature rose rapidly to reflux temperature (35° C.) but was cooled back to 30° C. After the addition was completed, the ice bath was removed and the reaction mixture was stirred for 1½ hours. A solution containing 125 milliliters of concentrated hydrochloric acid in 325 milliliters of water was then cautiously added to the reaction mixture. The ether layer of the mixture so obtained was separated and dried over anhydrous sodium sulfate. After the removal of the ether, the residue was distilled under reduced pressure to yield 63 grams (68 per cent yield) of 2-(5-tertiary-butyl-2-thienyl) ethanol, a water-white viscous fluid having a boiling point of 115–116° C. at a pressure of 3 millimeters of mercury and a refractive index of 1.5198 at a temperature of 20° C.

The phenylurethan derivative of this compound was prepared and was found to have a melting point of 73–74° C. and, upon analysis, showed a sulfur content of 10.71 per cent and a nitrogen content of 4.71 per cent, the calculated sulfur content being 10.56 per cent and the calculated nitrogen content being 4.62 per cent.

The thienylethanols prepared in accordance with the above described procedures are useful in preparing other intermediates such as the corresponding halides and amines. Dehydration of the above described thienylethanols by conventional means yields important vinyl or substituted vinylthiophenes useful in the plastics and rubber industries. The vinylthiophenes so obtained may be polymerized with heat and benzoyl peroxide to yield pale-yellow to orange colored polymers. The above described thienylethanol compounds may be dehydrated to the corresponding vinylthiophene compounds by contacting the ethanols with molten potassium hydroxide at a reduced pressure. Upon distillation of the mixture so obtained, the vinylthiophene compounds are distilled over, along with water, and the distillate separated into two layers. The desired vinylthiophene is then extracted from the aqueous layer with ether and the ether solution of vinylthiophene is dried over anhydrous sodium sulfate, the ether removed on a steam bath and the residue distilled under reduced pressure to yield the desired vinylthiophene compound.

The following examples will serve to illustrate the method of obtaining vinylthiophene compounds by dehydration of thienylethanol compounds:

*Example 5*

One hundred twenty grams of potassium hydroxide pellets were placed in a flask and heated until molten. The system was then evacuated to 45–50 millimeters of mercury and 64 grams (1 mole) of 2-(2-thienyl) ethanol were added dropwise at a rate of 1 milliliter per minute. A heterogeneous mixture of an oil and water distilled over from the partially evacuated flask into a receiver immersed in an ice bath. After the addition was completed, the dehydration flask was further heated until no more distillate was carried over. The distillate so obtained was extracted with diethyl ether and the aqueous layer separated. The remaining ether layer was dried over anhydrous sodium sulfate, the ether removed on a steam bath and the residue distilled under reduced pressure to yield 44 grams (80 per cent yield) of 2-vinylthiophene having a boiling point of 65.5–66.5° C. at a pressure of 48 millimeters of mercury and a refractive index of 1.5720 at 20° C.

*Example 6*

Sixty grams of potassium hydroxide pellets were placed in a dehydration apparatus similar to that described in Example 5 and heated until molten. The system was evacuated to 50 millimeters of mercury and 32 grams (0.23 mole) of 2-(5-methyl-2-thienyl) ethanol were added dropwise at a rate of 1 milliliter per minute. A heterogeneous mixture of an oil and water distilled over into a receiver which was immersed in an ice bath. After the addition was completed, the dehydration flask was further heated until no more distillate was carried over. A distillate so obtained was extracted with diethyl ether and the aqueous layer separated. The remaining ether layer was dried over anhydrous sodium sulfate, the ether removed on a steam bath and the residue distilled under reduced pressure to yield 26.5 grams (95 per cent yield) of 4-methyl-2-vinylthiophene having a boiling point of 86.5–87.5° C. at a pressure of 45 millimeters of mercury and a refractive index of 1.5590 at 25° C.

*Example 7*

Sixty grams of potassium hydroxide pellets were placed in the dehydration apparatus described above and heated until molten. The system was evacuated to 46–48 millimeters of mercury and 46 grams (0.25 mole) of 2-(5-tertiary-butyl-2-thienyl) ethanol were added dropwise over a period of 1½ hours. A heterogeneous mixture of an oil and water distilled over into a receiver immersed in an ice bath. After the addition was completed, the dehydration flask was further heated until no more distillate was carried over. The distillate so obtained was extracted with diethyl ether and the aqueous layer separated. The remaining layer was dried over anhydrous sodium sulfate and the ether was removed on a steam bath. Distillation of the residue under reduced pressure yielded 39 grams (94 per cent yield) of 5-tertiary-butyl-2-vinylthiophene having a boiling point of 104–105° C. at a pressure of 24 millimeters of mercury and a refractive index of 1.5357 at 20° C.

I claim:

1. A compound having the general formula:

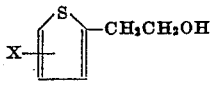

where X represents a halogen substituent.

2. 2-(5-chloro-2-thienyl) ethanol.

3. A method for preparing a halothienylethanol having at least one of the nuclear hydrogen atoms of the thiophene ring replaced by halogen, which comprises reacting a halogenated thiophene having a replaceable nuclear hydrogen atom with sodium in the presence of an ether solvent having not more than four carbon atoms per atom of oxygen to yield a reaction mixture containing a halothienylsodium, contacting said reaction mixture with ethylene oxide at a temperature below the boiling point of said ether solvent and hydrolyzing the resulting sodium halothienyl ethylate compound obtained to yield a halothienylethanol.

4. A method for preparing a halothienylethanol having at least one of the nuclear hydrogen atoms of the thiophene ring replaced by halogen, which comprises reacting a halogenated thiophene having a replaceable nuclear hydrogen atom with finely divided sodium in the presence of an ether solvent having not more than four carbon atoms per atom of oxygen to yield a reaction mixture containing a halothienylsodium, contacting said reaction mixture with ethylene oxide at a temperature between about 0° C. and about 10° C. and hydrolyzing the resulting sodium halothienyl ethylate compound obtained to yield a halothienylethanol.

5. A method for preparing a halothienylethanol having at least one of the nuclear hydrogen atoms of the thiophene ring replaced by halogen, which comprises reacting a halogenated thiophene having a replaceable nuclear hydrogen atom with sodium in the presence of diethyl ether solvent to yield a reaction mixture containing a halothienylsodium, contacting said reaction mixture with ethylene oxide at a temperature below the boiling point of said diethyl ether solvent and hydrolyzing the resulting sodium halothienyl ethylate compound obtained to yield a halothienylethanol.

6. A method for preparing a halothienylethanol having at least one of the nuclear hydrogen atoms of the thiophene ring replaced by halogen, which comprises reacting a halogenated thiophene having a replaceable nuclear hydrogen atom with sodium amalgam in the presence of diethyl ether solvent to yield a reaction mixture containing a halothienylsodium, contacting said reaction mixture with ethylene oxide at a temperature between about 0° C. and about 10° C. and hydrolyzing the resulting sodium halothienyl ethylate compound obtained to yield a halothienylethanol.

7. A method for preparing a chlorothienylethanol having at least one of the nuclear hydrogen atoms of the thiophene ring replaced by chlorine, which comprises reacting a chlorinated thiophene having a replaceable nuclear hydrogen atom with sodium in the presence of an ether solvent having not more than four carbon atoms per atom of oxygen to yield a reaction mixture containing a chlorothienylsodium, contacting said reaction mixture with ethylene oxide at a temperature below the boiling point of said ether solvent and hydrolyzing the resulting sodium chlorothienyl ethylate compound obtained to yield a chlorothienylethanol.

8. A method for preparing a chlorothienylethanol having at least one of the nuclear hydrogen atoms of the thiophene ring replaced by chlorine, which comprises reacting a chlorinated thiophene having a replaceable nuclear hydrogen atom with sodium in the presence of diethyl ether solvent to yield a reaction mixture containing a chlorothienylsodium, contacting said reaction mixture with ethylene oxide at a temperature below the boiling point of said diethyl ether solvent and hydrolyzing the resulting sodium chlorothienyl ethylate compound obtained to yield a chlorothienylethanol.

9. A method for preparing a chlorothienylethanol having at least one of the nuclear hydrogen atoms of the thiophene ring replaced by chlorine, which comprises reacting in an inert atmosphere a monohalogenated thiophene having a replaceable nuclear hydrogen atom with finely divided sodium in the presence of diethyl ether solvent to yield a reaction mixture containing a chlorothienylsodium, reacting said reaction mixture with ethylene oxide at a temperature below the boiling point of said diethyl ether solvent and hydrolyzing the resulting sodium chlorothienyl ethylate compound obtained to yield a chlorothienylethanol.

10. A method for preparing 2-(5-chloro-2-thienyl)ethanol, which comprises reacting 2-chlorothiophene with sodium amalgam in an inert atmosphere and in the presence of diethyl ether solvent to yield a reaction mixture containing 5 - chloro - 2 - thienylsodium, contacting said reaction mixture with ethylene oxide at a temperature below the boiling point of said diethyl ether solvent and hydrolyzing the resulting sodium chlorothienyl ethylate compound obtained to yield 2-(5-chloro-2-thienyl)ethanol.

JOHN W. SCHICK.

REFERENCES CITED

The following references are of record in the file of this patent:

UNITED STATES PATENTS

| Number | Name | Date |
|---|---|---|
| 1,966,488 | Dorrer | July 17, 1934 |

OTHER REFERENCES

Richter: "Organic Chemistry," pp. 649, 650. John Wiley, N. Y., 1938.

Whitmore: "Organic Chemistry," page 893, Van Nostrand, N. Y., 1937.